United States Patent [19]
Ogino et al.

[11] Patent Number: 5,267,097
[45] Date of Patent: Nov. 30, 1993

[54] INFORMATION TRANSFER CONTROL SYSTEM HAVING ROTARY STORAGE UNIT WHICH USES A PSEUDO ADDRESS MARK

[75] Inventors: Akihito Ogino, Kanagawa; Michio Miyazaki; Kiyoshi Hisano, both of Odawara, all of Japan

[73] Assignee: Hitachi, Ltd., Tokyo, Japan

[21] Appl. No.: 944,820

[22] Filed: Sep. 14, 1992

Related U.S. Application Data

[63] Continuation of Ser. No. 481,875, Feb. 20, 1990, abandoned.

[30] Foreign Application Priority Data

Mar. 6, 1989 [JP] Japan ................................ 1-52080

[51] Int. Cl.⁵ ............................................. G11B 5/09
[52] U.S. Cl. ......................................... 360/49; 360/51
[58] Field of Search ............... 360/39, 72.2, 49, 51, 360/72.1, 71, 75, 78.01-78.04; 369/32; 364/238.3, 239.7, 236.2, 248.1, 939.3, 952.1

[56] References Cited

U.S. PATENT DOCUMENTS

| | | | |
|---|---|---|---|
| 4,126,887 | 11/1978 | Miyazaki et al. | 360/49 |
| 4,206,476 | 6/1980 | Hashimoto | 358/127 |
| 4,893,193 | 1/1990 | Nakamura et al. | 358/341 |
| 4,903,195 | 2/1990 | Homma | 364/200 |

FOREIGN PATENT DOCUMENTS 54-146941 11/1979 Japan.
62-3455 1/1987 Japan.
62-145569 6/1987 Japan.

OTHER PUBLICATIONS

English Translation of JP62-3455.

Primary Examiner—Donald T. Hajec
Assistant Examiner—Won Tae C. Kim
Attorney, Agent, or Firm—Fay, Sharpe, Beall, Fagan, Minnich & McKee

[57] ABSTRACT

When a positioning operation of a head on a track of a disk including a target record is completed, information is read out from the track of the disk and stored in a buffer memory without waiting a read command from a host side controller. A transfer operation of the target record of the information from the buffer memory to the controller is performed when the controller is not busy and generates the read command. A transfer rate of the record from the buffer memory to the controller is made faster than a read rate of the information from a disk or a write rate into the buffer memory, so that a nominal transfer rate of an entire system is increased without changing the read or write rate.

7 Claims, 6 Drawing Sheets

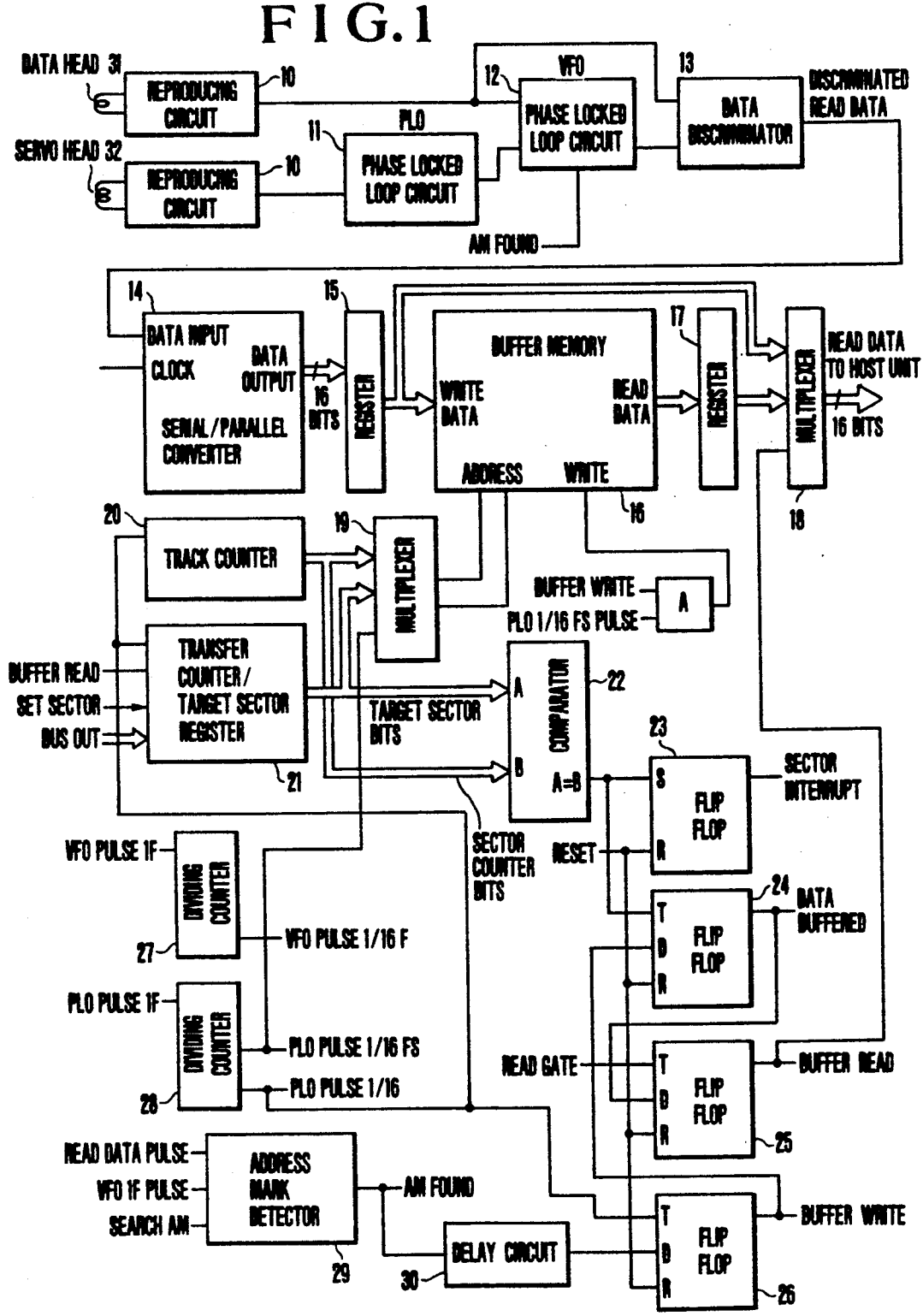
F I G. 1

Ar: READ MEMORY ADDRESS
Aw: WRITE MEMORY ADDRESS

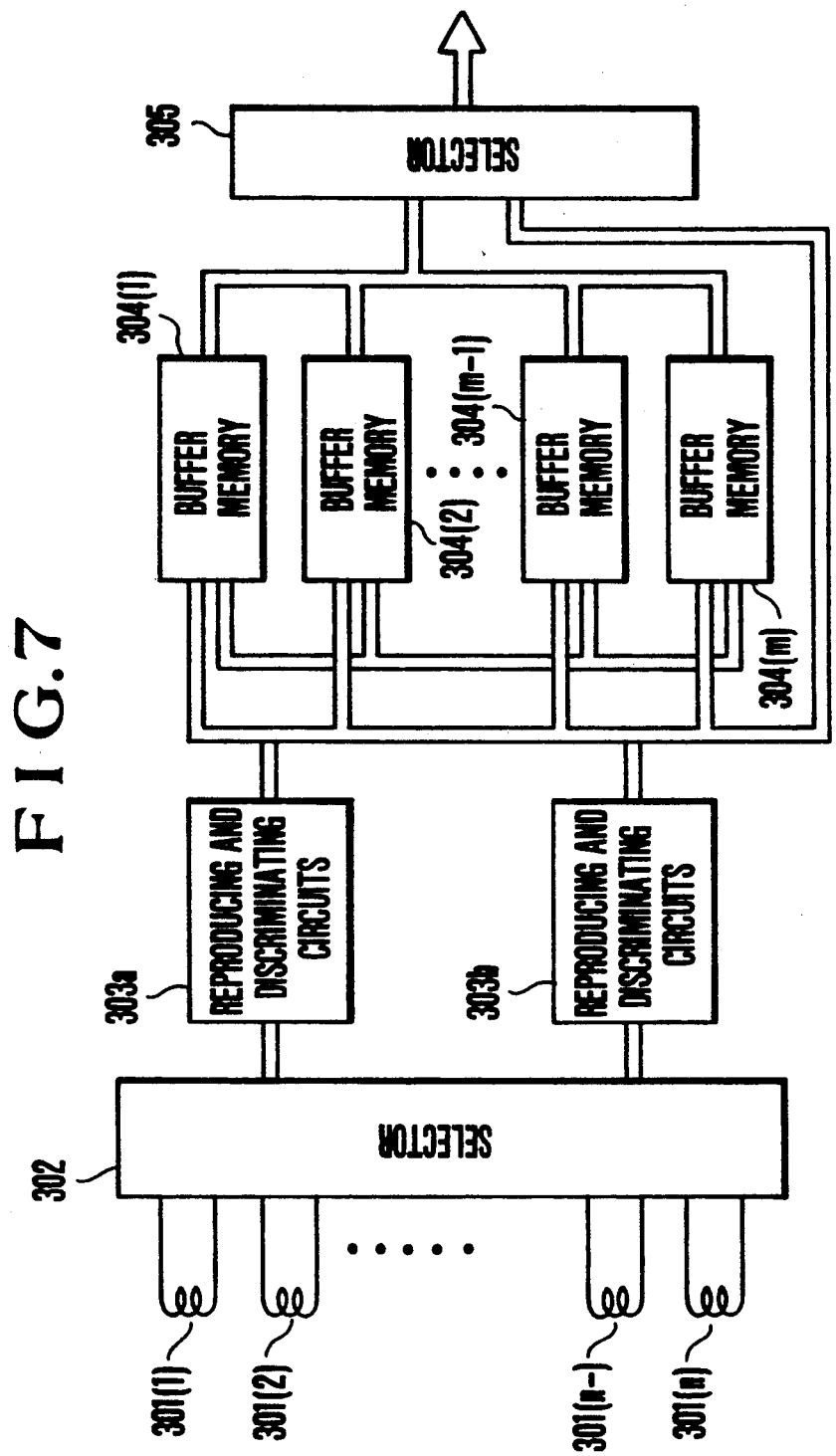

INFORMATION TRANSFER CONTROL SYSTEM HAVING ROTARY STORAGE UNIT WHICH USES A PSEUDO ADDRESS MARK

This is a continuation of application Ser. No. 07/481,875 filed Feb. 20, 1990, abandoned.

BACKGROUND OF THE INVENTION

The present invention relates to a transfer system of information for a rotary storage unit, e.g., a storage unit using a rotating storage medium such as a magnetic disk or a photo disk, and more specifically, to control of read and write operations of the information for the rotary storage unit, thereby increasing throughput of an entire information processing system.

Generally, in a large scale magnetic disk apparatus, a plurality of disk units, i.e., disk drive units are connected to a disk controller and to a host unit through it to commonly use it in many cases. In such an apparatus, there occurs a problem in that, when one of the disk units is operatively connected to the disk controller, a sector interrupt from another disk unit can not be easily accepted by the disk controller or the host unit.

Here, the term "a sector" means each portion of that circle of a track on the disk which is divided in a circular direction with a predetermined period. One record corresponds to one sector in a fixed-length record format and one record corresponds to one to a few sectors in a variable-length record format. The term "a sector interrupt" means a notice for informing to the disk controller or the host unit (to be referred to as a host side unit hereinafter) that a head of the disk unit reaches a target sector and a write or read operation can be performed for the target sector.

In order to dissolve the above problem, a conventional method, as is disclosed in Japanese Patent Unexamined Publication JP-A-62-145569, is known. In the method, a counter is provided in the disk controller in correspondence with each disk unit, and when a RPS (disk rotation position sensing) interrupt, e.g., a sector interrupt is not informed from one of the drive units to the host side unit in spite of exceeding a predetermined value set in a corresponding counter because the RPS interrupts are generated from other disk units, the sector interrupt from the drive unit is given the highest priority to be informed to the host side unit by changing a timing when the sector interrupt is generated.

In addition, another method for dissolving the above problem is disclosed in Japanese Examined Patent Publication JP-B-62-3455. In this method, in a case where information is to be read out from a disk and to be transferred to a host side unit, the read out information is stored in a buffer memory provided for each disk unit if a disk controller is so busy that it cannot be operatively connected to the disk unit when a sector interrupt is generated to the disk controller by the disk unit, and the information stored in the buffer memory is transferred to the disk controller when it is not busy. In contrary, in a case where information is to be written from the host side unit such as the disk controller or a host unit into the disk, the information from the host side unit is temporarily stored in the buffer memory and written in the disk after a read/write section in the disk unit reaches a predesignated rotation position on the disk, i.e., a target sector.

However, the following two problems are in the conventional method disclosed in the above JP-A-62-145569. First, changing the timing when the sector interrupt is generated means that the sector interrupt is generated at a timing shifted from an optimal timing. Therefore, the throughput of the entire system is decreased.

Second, the above conventional method cannot be applied to a system employing a large scale disk apparatus, wherein, in the apparatus, two disk controllers (to be referred to as controllers hereinafter) are connected to a plurality of disk units (to be referred to as rotary storage units hereinafter), a sector interrupt from one of the rotary storage units is informed to a host unit through one of the controllers which is not busy, and thereby the throughput of the system is increased (see Japanese Unexamined Patent Publication, JP-A-54-146941).

With the conventional method disclosed in the above JP-A-62-3455, there are the following four problems:

First, in the method, when it is detected that a rotary storage unit cannot be operatively connected to the controller, i.e., that the controller is busy, the rotary storage unit continues to store or starts to store information read out from a predesignated sector by the rotary storage unit in the buffer memory (to be referred to as the buffer hereinafter). Therefore, there is a case where a write operation on the information from the sector into the buffer by the rotary storage unit is not yet completed in spite of rotation of the disk for one or more cycles after the read section is positioned on the predesignated sector. In this case, the information must be transferred from the buffer to the controller after the write operation of the information from the sector is completed. As a result, the method requires a long rotation waiting time until the disk is rotated for one or more cycles after the positioning operation is completed. Second, in the method, a read section for reading out information from a rotary storage unit without a read/write command from the controller is not taken account for. That is, in the conventional method, a read/write operation is not started immediately when a seek operation by the read/write section (the head) is completed so as to position or track the head on a target track but performed in response to the read/write command for a predetermined sector when a rotating storage medium is rotated to a predetermined position relative to the head.

Second, there is no description concerning means for reading out the information from the rotary storage unit without a read or write command from the controller. More specifically, in the conventional method, the read or write operation is not started immediately after a seek operation of the read/write section (a head) is completed so as to position or "on-track" the head on a target track but started when the head reaches a target sector after a read or write command for the target sector is received from the controller.

Third, only the effect in that performance of a computer system is increased by buffering the information when the controller is busy can be obtained. That is, increase in a data transfer rate, decrease in the waiting time unitl the desired data is obtained, or the like are not taken account for.

A first object of the present invention is to provide an information transfer control system, having a rotary storage unit, in which data from arbitrary rotation position can be read out without a rotation waiting time after a head is positioned on a desired cylinder or track.

A second object of the present invention is to provide a disk control system in which data can be read out from a rotary storage unit without receiving a read command from the controller, wherein data is read out at the same time from a plurality of tracks defined by a common cylinder on a plurality of disks, so that any data other than data recorded on a track designated by the upper device can also be transferred to the upper devices without waiting for positioning of the head on the track.

SUMMARY OF THE INVENTION

In order to achieve the above objects, in the information transfer system having the rotary storage unit, when a positioning operation of a head on a target track, including a desired record, of the rotating storage medium is completed, information is read out from the target track without waiting for the read command from the host side controller and transfer of the information to a buffer memory is started, the buffer memory being for temporarily storing the information to be transferred between the rotary storage unit and the host side unit.

In such a system, the information, which includes the desired record, for at least one track is preferably transferred and stored from the rotating storage medium into the buffer memory. Transfer of the desired record from the buffer memory to the host side unit is performed when the host side unit is not busy and generates the read command.

In the information transfer system having the rotary storage unit of the present invention, the transfer rate of the information between the buffer memory and the host side unit is made faster than or twice or more times as fast as the read rate from or the write rate in the rotating storage medium.

The buffer memory is composed of a non-volatile memory, and write information transferred from the host side unit is temporarily stored in the buffer memory, and then is read out from the buffer memory and written in the rotating storage medium, when the medium is rotated at a desired position. In this case, when the write information is not written in the medium because of the failure of the power supply or the like, the information is written in the medium by using the information remaining in the buffer memory after the power supply is recovered.

In order to achieve the third object, a plurality of heads are positioned on respective tracks corresponding to the identical cylinder. When information is to be read out from a desired one of the tracks through a corresponding one of the heads, other information is read out from other tracks through other heads, respectively, and this read out information is stored in corresponding buffer memories. Thus, when a read command for another track is received from the host side unit, the information from another track can be immediately read out from the buffer memory and transferred to the host side unit.

As apparent from the above, according to the information transfer system having the rotary storage unit of the present invention, when a positioning operation of a head on a desired track is completed, a read operation from the desired track is started without waiting for a read command from a host side unit. The read out information is stored in a buffer memory in the same format as is written in the medium, i.e., the read out information, including a desired record, for one track is stored in the buffer memory. A sector interrupt is generated when the head reaches a sector immediately before a sector concerning the record to be read out, i.e., of the desired record. The sector interrupt is held until the desired record is transferred to the host side unit when the host side unit is not busy, i.e., it is free, and generates the read command, even though the desired record field is passed with respect to the head.

When receiving the read command, the rotary storage unit regards a sector number corresponding to the desired record as an address, reads out the desired record from the buffer memory in accordance with the address, and transfers the read out record to the host side unit.

That is, in the present invention, the read operation is unconditionally started without the read command from the host side unit upon completion of a positioning operation of the head, and the information for one track, which includes not only the desired record but also records before and after it, is stored in the buffer memory. In a conventional method, only the desired record is stored in the buffer memory on a condition that the host side unit is busy. On the other hand, in the present invention, the desired record can be reliably stored in the buffer memory until the medium is rotated for at least one cycle after the positioning operation of the head (the seek operation) is completed. Therefore, the time necessary for the transfer can be shortened.

As apparent from the above, the desired record can be always read out without waiting rotation of the medium after the sector interrupt goes high once. Therefore, the throughput of the system can be increased.

Further, according to the present invention, the pseudo address mark (AM) is provided before each field and the VFO circuit in the information reproducing circuit is switched to be connected to the information read out from the rotating storage medium. Therefore, the reliable information can be transferred from the medium to the buffer memory.

BRIEF DESCRIPTION OF THE DRAWINGS

FIG. 1 is a block diagram showing an arrangement of a disk control system according to a first embodiment of the present invention;

FIG. 7 is a block diagram showing an arrangement of a disk control system according to a fourth embodiment of the present invention.

DESCRIPTION OF THE PREFERRED EMBODIMENTS

First Embodiment

Figure 2:
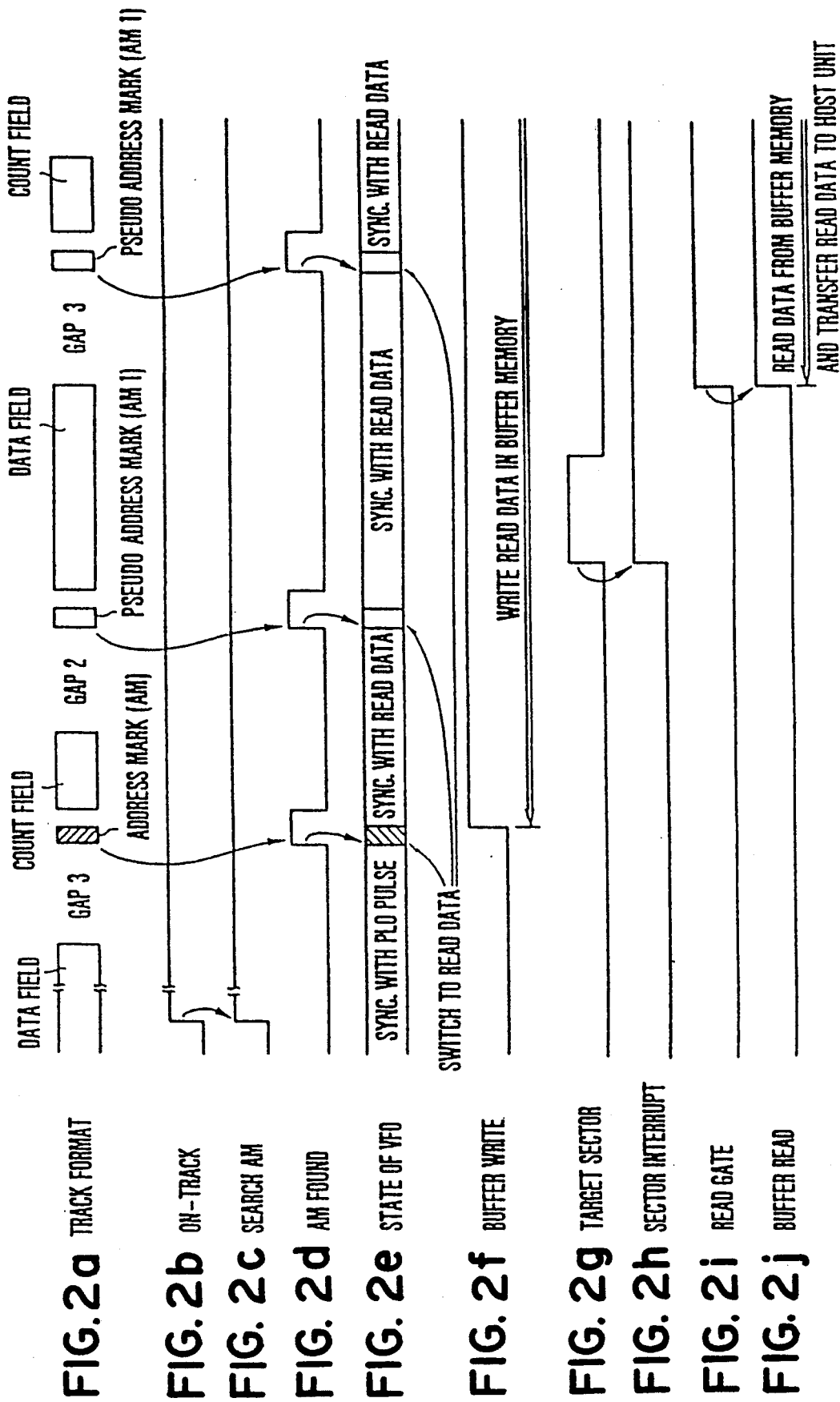
FIG. 2a–2j are diagrams for explaining an operation of the first embodiment.

FIG. 1 is a block diagram showing an entire arrangement of a magnetic disk control system according to a first embodiment of the present invention and FIGS. 2a to 2j are diagrams for explaining an operation of the first embodiment.

In FIG. 1, a data head 31 reads or writes data from or in a disk, and a servo head 32 reads out servo data which is used for generating a position signal for positioning the data head and a reference clock signal synchronous with rotation of a disk. A phase locked loop circuit (PLO) 11 inputs a servo clock signal corresponding to the servo data read out by the servo head. A phase locked loop circuit (a variable frequency oscillator: VFO) 12 inputs a read data pulse signal representing the data read out by the data head when track data is to be read out from the disk and input an output (a PLO pulse IF signal) from the PLO 11, otherwise. A data discriminator 13 discriminates "1" or "0" of each bit of the read out data, represented by the read data pulse signal, in accordance with an output (a VFO pulse IF signal) from the VFO.

A serial/parallel converter 14 converts to n-bit parallel track data, serial track data of the read out data discriminated by the discriminator 13, and a register 15 temporarily holds the converted data. A buffer memory 16 is composed of a semiconductor memory or the like and temporarily stores the parallel track data. A register 17 temporarily holds record data read out from the buffer memory 16, and a multiplexer 18 selectively transfers the record data read out from the buffer memory 16 or current record data of the track data held in the register 15, to a host side unit, i.e., a controller (not shown).

A dividing counter 27 divides the output from the VFO 12, whose period is one bit, into one-sixteenth, and a dividing counter 28 divides the output from the PLO 11 into one-sixteenth. When a track of the disk for one cycle is divided in units of 2-byte areas and one address is assigned to each 2-byte area, a track counter 20 counts the areas as the write memory addresses as the disk is rotated. For example, if one circular track includes 5000 bytes, the counter 20 counts 1 to 2500 addresses as the disk is rotated. A transfer counter/target sector register 21 stores a target sector number from the host side unit and generates a read memory address from the stored target sector number when data is to be read out and transferred from the buffer memory to the host side unit. A multiplexer 19 supplies to the buffer memory the read memory address from the register 21 in a read cycle and the write memory address from the counter 20 in a write cycle.

A comparator 22 compares upper bits of the write memory address from the counter 20 as sector counter bits at its input B with upper bits of the read memory address from the counter 21 as target sector count bits at its input A. A flip-flop generates "a sector interrupt signal" for informing to the host side unit that a current sector number (the sector counter bits) coincides with a target sector number (the target sector bits), i.e., the input A = the input B. A flip-flop 24 generates "a data buffered signal" which represents that a write operation into the buffer memory is already started when the sector interrupt signal goes high. A flip-flop 25 generates "a buffer read signal" as a control signal for transferring the record data from the buffer memory to the host side unit. A flip-flop 26 generates "a buffer write signal" as a control signal for writing the track data read out from the disk into the buffer memory.

An address mark detector 29 detects an address mark. When the address mark is detected, a delay circuit 30 delays generation of the buffer write signal by a time required for the VFO 12 to stabilize before the write operation into the buffer memory is started.

Note that the system shown in FIG. 1 is provided for each disk unit.

Next, an operation of the first embodiment will be described below with reference to FIG. 2a and 2j.

A track format on the disk is shown in FIG. 2(a). In this embodiment, the operation will be described based on the variable-length (CKD) system. In the CKD system, a record generally includes a count section (C), a key section (K) and a data section (D) and an address mark (AM) is provided as a mark for indicating start of the record. In this embodiment, pseudo AMs, which can be differed from the AM before the count section, are further provided before the key and data sections. Functions of the pseudo AMs will be described later. Note that the key section can be omitted in the embodiment.

At first, the host side unit transmits to a disk unit a cylinder number and a head number of a cylinder of the disk and the data head relating to a desired record, and a sector number of a sector prior to that relating to the desired record by a few sectors. In addition, the host side unit disconnects the disk unit to perform another job after issuing a seek command. When receiving the command, the disk unit loads the target sector number in the register 21 through a set sector input terminal and starts a seek operation.

When the seek operation is completed and the data head is positioned on the target cylinder, i.e., at a time when a level of a waveform shown in FIG. 2(b) goes high, a comparison operation between the contents of the track counter 20 and the target sector register 21 is started. When coincidence is obtained, i.e., when the target sector is detected, as shown in FIG. 2(g), the flip-flop 23 is set to raise the sector interrupt signal for the host side unit to a high level, as shown in FIG. 2(h). In parallel to the above operation, the following operation is performed as one of the features of the present invention.

More specifically, a detecting operation of the AM is started immediately after the head is positioned on the target cylinder, i.e., at a time when a level of a waveform shown in FIG. 2(c) rises. When the AM is first detected, as shown in FIG. 2(d), an input of the VFO 12 is switched from a PLO pulse signal side to a read data pulse signal side, as shown in FIG. 2(e) and hence the input of the VFO 12 is connected to the read out data. When a predetermined time is elapsed, i.e., when the connection of the input of the VFO 12 to the read out data is completed, the flip-flop 26 is set to raise the buffer write signal to a high level, and as a result, the write operation into the buffer memory 16 is started, as shown in FIG. 2(f).

The buffer write signal is generated without waiting for a read command from the host side unit. Note that a period from a time when search for the AM is started to a time when connection of the data in the first field to the input of the VFO is completed is so short that it is negligible, compared to a period of time until the target sector is detected in a conventional system.

As one of the features of the present invention, the write operation into the buffer memory can be performed regardless of whether or not the host side unit is busy.

The track data written in the buffer memory is generated as follows. The read data pulse signal generated by the reproducing circuit 10 is discriminated by the data discriminator 13, with the result that the serial track data of the NRZ format is obtained which is synchronized with the output from the VFO 12, i.e., the VFO pulse 1F signal. The obtained serial data is converted to the parallel track data by the serial/parallel converter (shift register) 14. The 16-bit parallel system is employed in the embodiment.

The parallel track data is temporarily loaded into the register 15 having the capacity of two bytes, and the output from the register is the write data into the memory 16. The length of data transfer from the disk into the buffer memory 16 every access (a seek operation) is preferable for one track in this embodiment. However, it may be for tracks corresponding to a cylinder position, as described later.

Data transmitted from the host unit is usually converted to data of a code modulation format such as FM, MFM, and RLL and stored in a rotating recording medium. In the embodiment, the data read out from the rotating recording medium may be stored in the buffer memory in a read out manner without demodulating the data of a code modulation format such as FM, MFM, and RLL.

Figure 3:
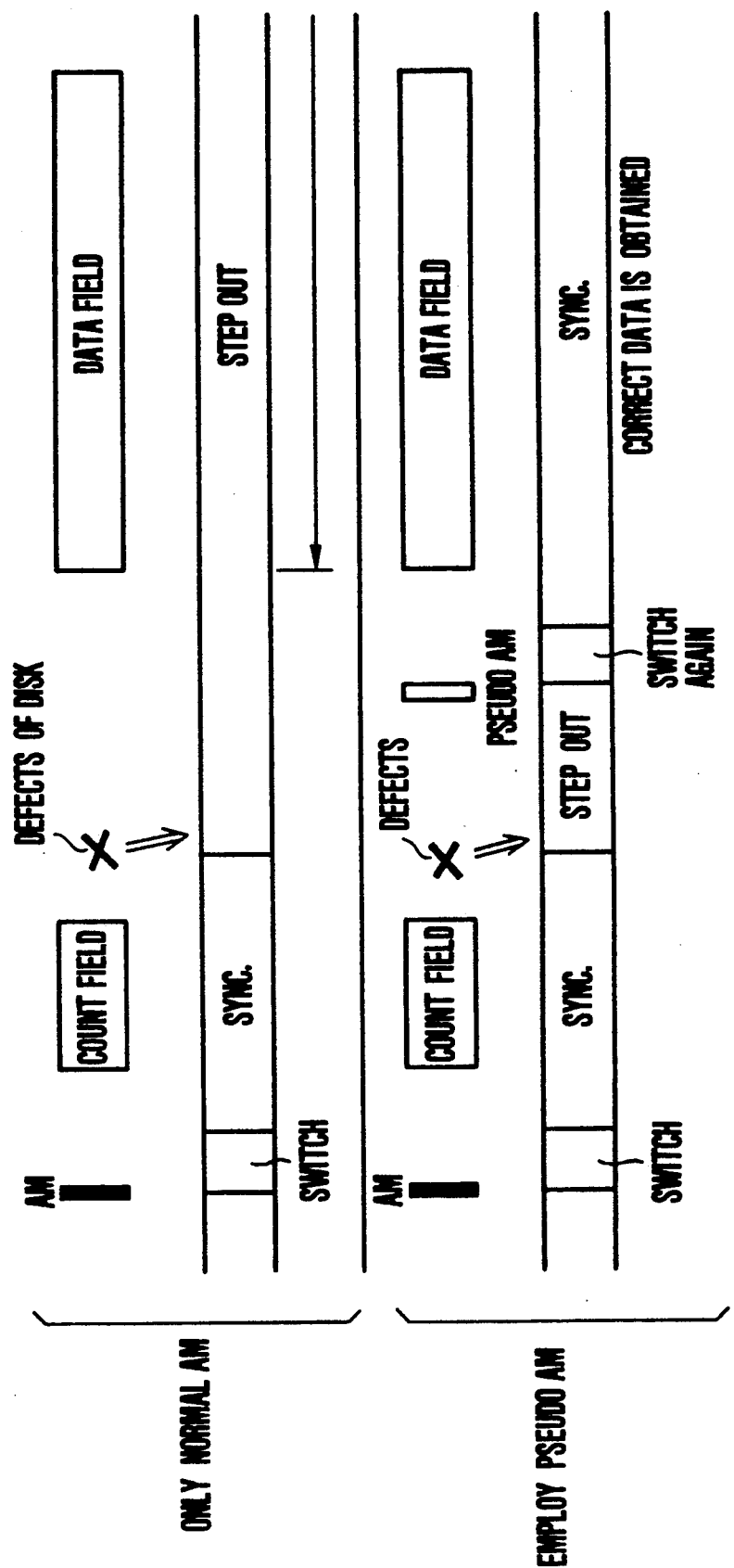
FIG. 3 is a diagram for explaining the effect of a pseudo address mark (AM)

The effect of the pseudo AM will be described below. FIG. 3 shows a diagram for explaining the effect of the pseudo AM, an example in which the pseudo AM is not used is shown in a upper portion and an example in which the pseudo AM is used is shown in a lower portion. Since defects on a disk surface cannot be generally avoided, a method for skipping the defects is employed in the CKD system. In a conventional system in which the read/write operation is performed in response to the read command from the host side unit, since the host side unit recognizes where the defects are, a command for skipping the defect is issued from the host unit side, so that the influence to the track data due to the defects can be avoided. However, in the buffer write operation according to the present invention, since the operation is performed without waiting the read command from the host side unit, the defects on the recording storage medium cannot be skipped. As a result, a signal read out from the defects is occasionally input to the VFO. Therefore, the VFO sometimes steps out because of the defects. If the step-out occurs, the following data is false. In order to avoid this phenomenon, the pseudo AM is provided before each field and the input of the VFO is switched to the read data pulse signal side each time the pseudo AM is detected. As a result, when the data in each field, i.e., the data field or the key field, is to be read out from the medium, the VFO is always synchronous with the read data and correct read data can be discriminated.

The track data thus obtained is written into the memory 16, and when the current sector number coincides with the target sector number, the flip-flop 23 is set to generate the sector interrupt signal to the host side unit, as shown in FIG. 2(h). When, in response to the sector interrupt signal, the host side unit issues the read command within a predetermined period of time, i.e., when the head is on a position of the recording medium prior to the start of the target sector, so that the read operation from the start of the target sector is in time, the output from the register 15 is transferred to the host side unit not through the memory 16 but directly.

On the other hand, when the host side unit is busy and cannot respond to the sector interrupt signal within the predetermined period of time, i.e., when the head has passed the start of the target sector and the read command is not received from the host side unit, the sector interrupt signal is left high. Thereafter, when the host side unit is released from another job and responds to the sector interrupt signal, i.e., when the host side unit issues the read command, the flip-flop 25 is set in response to the read command supplied to a read gate terminal, as shown in FIG. 2(i), so that the record data read out from the buffer memory 16 is transferred to the host side unit through the multiplexer 18, as shown in FIG. 2(j). At this time, an initial value of the read memory address is the target sector number and then is counted up every two bytes. The output from the track counter 20 is used as the write memory address in the write cycle. An address switching operation is performed by the multiplexer 19.

In this manner, after the sector interrupt signal goes high once, the read command can be always accepted. Therefore, as in the conventional system, a phenomenon that the sector interrupt signal from a disk unit is not accepted for a long time can be avoided, and hence the throughput of the entire system can be increased.

In the embodiment, when the read command is issued from the host side unit, it is described that the record data is directly transferred to the host side unit, if the track data is transferred from the disk to the buffer memory but the data head does not reach the target sector. However, the same operation is also performed when the transfer from the disk to the buffer memory is not yet started.

Figure 4:
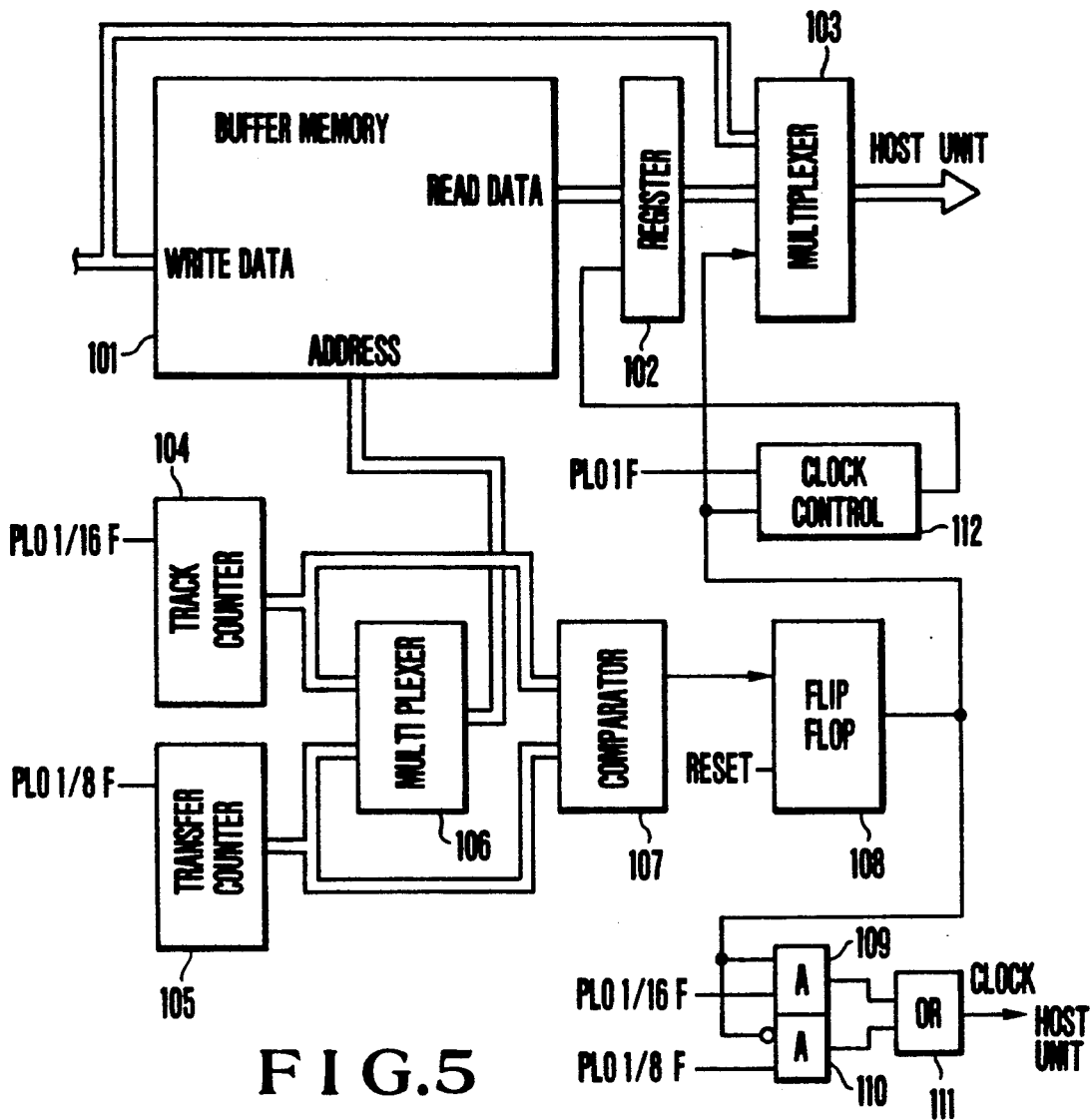
FIG. 4 is a block diagram showing an arrangement of a disk control system according to a second embodiment of the present invention.
Figure 5:
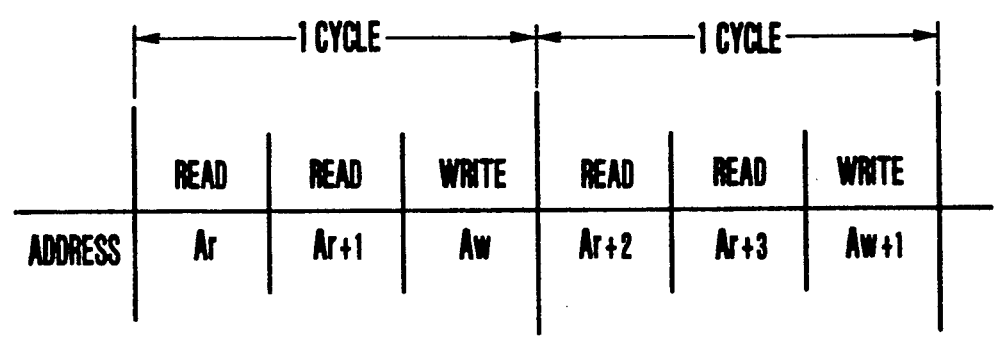
FIG. 5 is a diagram for explaining an operation of the second embodiment shown in FIG. 4.

Second Embodiment (see FIGS. 4 and 5)

The second embodiment of the present invention will be described below with reference to FIGS. 4 and 5.

FIG. 4 is a block diagram showing an arrangement of the second embodiment and FIG. 5 shows memory cycles as one of the features of the present invention.

In FIG. 4, a buffer memory 101 temporarily stores the track data read out from the disk. A register 102 is for output from the buffer memory and a multiplexer 103 selects the record data to be transferred to the host side unit through the buffer memory 101 or that to be directly transferred. A counter 104 generates the write memory addresses in the memory write cycle and a transfer counter 105 generates the read memory addresses in the memory read cycle. A multiplexer 106 switches between the write memory address in the memory write cycle and the read memory address in the memory read cycle. A comparator 107 compares the read address with the write address to check whether or not the read address catches up with the write address. A flip-flop 108 is set according to the output from the comparator 107. A clock controller 112 controls a switching operation of clock frequencies before and after the read address catches up with the write address, based on the output from the flip-flop 108. AND circuits 109 and 110 and an OR circuit 111 are for generating a clock signal sent to the host side unit.

Next, an operation of the second embodiment in FIG. 4 will be described below. The operation from when the track data is read out from the disk to when the read out data is stored in the buffer memory 101 is the same as that in the first embodiment. As shown in FIG. 5, one of the features in this embodiment is in that a transfer rate of the record data read out from the buffer memory 101 to the host side unit is made faster than a write rate of the track data read out from the disk into the buffer memory 101. In this embodiment the former is twice as fast as the later. As shown in FIG. 5, the read operation is performed twice for every memory cycle so that two consecutive data items are read out so as to speed-up the system.

For this purpose, an input clock signal to the transfer counter 105 for .generating the read memory addresses has twice the frequency of as an input clock of the track counter 104. The read address occasionally catches up with the write address since the rate of the read operation is faster than that of the write operation. In such a case, an output from the comparator 107 becomes active and hence the flip-flop is set. When the flip-flop 108 is set, an input of the multiplexer is switched such that the record data of the track data from the disk is directly transferred to the host side unit. At the same time, the frequency of the clock signal sent to the host side unit by the logic gates 109 to 111 is returned to the original frequency, and the transfer rate is set to the same value as a read rate of the track data from the disk.

In this manner, in the present invention, a read rate of the record data from the buffer memory is made faster than that of the track data from the disk, resulting in increasing the throughput of the system.

Figure 6:
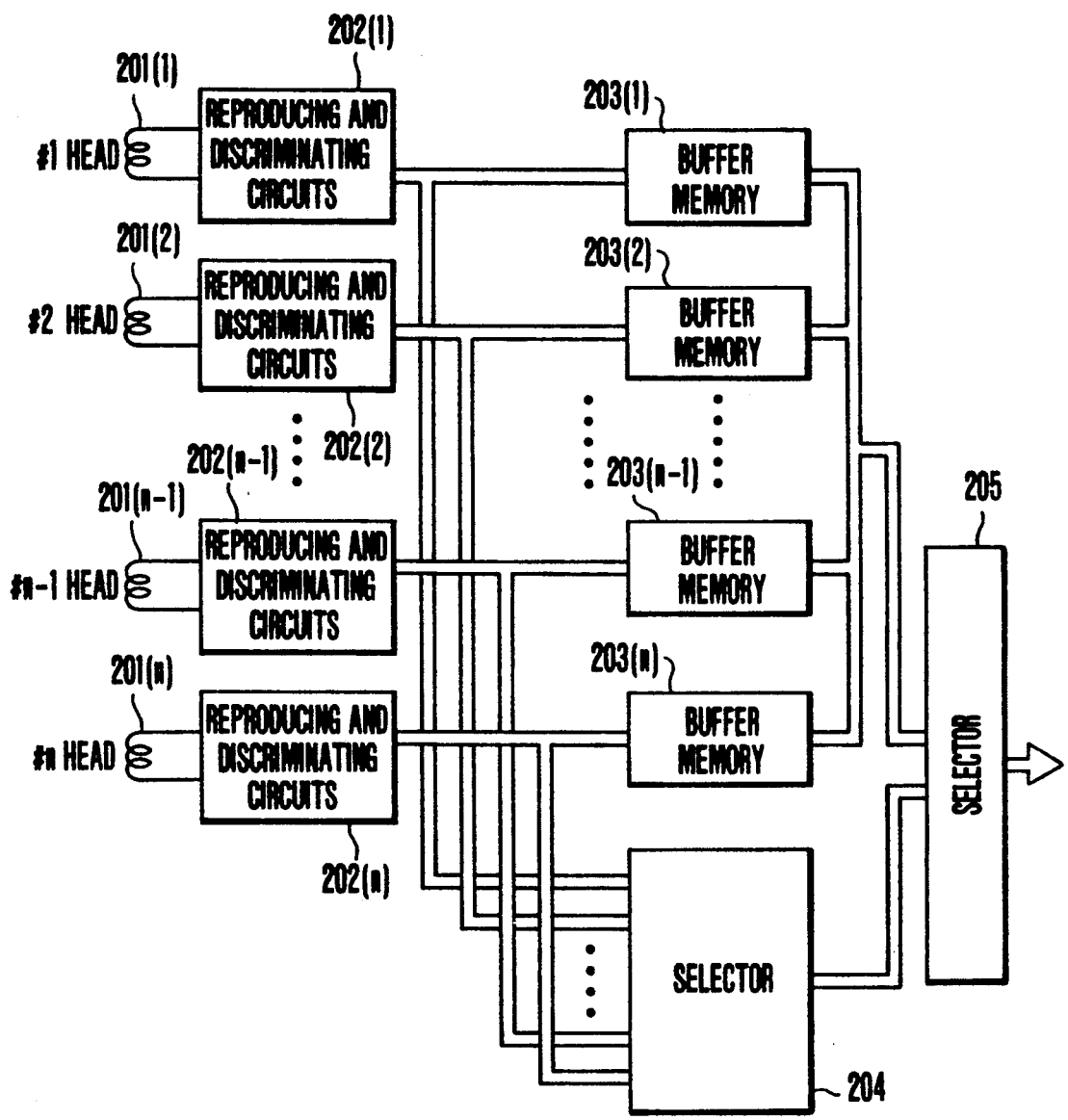
FIG. 6 is a block diagram showing an arrangement of a disk control system according to a third embodiment of the present invention.

Third Embodiment (see FIG. 6)

A third embodiment of the present invention will be described with reference to FIG. 6.

In FIG. 6, numerals 201(1) to 201(n) indicates a plurality of heads which are respectively provided for a plurality of disk surfaces and which are respectively positioned on corresponding cylinders of the disk surface at a time. Numerals 202(1) to 202(n) indicate reproducing and discriminating circuits respectively provided for the heads, and numerals 203(1) to 203(n) buffer memories respectively provided for the heads. Numeral 204 indicates a selector for selecting one from among outputs from the heads as the record data to be supplied to a host side unit, and numeral 205 indicates a selector for selecting as the record data to be supplied to the host side unit, an output from one of the buffer memories or an output from one of the reproducing and discriminating circuits.

Next, an operation of the embodiment will be described below. An operation associated with a head designated by the host side unit when a seek operation is completed, e.g., #1 head 201(1), is the same as that in the first embodiment. The different point is in that, independent on the #1 head, each of other #2 to #n heads reads out the track data from the corresponding disk surface and stores the read out data in a corresponding one of the buffer memories 203(2) to 203(n). When the read command for one of the other #2 to #n heads is received, the record data is read out from a buffer memory corresponding to the head designated by the read command and transferred to the host side unit through the selector 205. In this case, it is preferable that a memory address corresponding to a sector number from the host side unit is generated, and that the record data is read out from the buffer memory in accordance with the memory address and transferred to the host side unit.

In this manner, when the read command for one of the heads except for a current head is received, the record data can be transferred to the host side unit without waiting rotation of the disk, thereby increasing the performance of the system.

Fourth Embodiment (see FIG. 7)

FIG. 7 is a block diagram showing an arrangement of the fourth embodiment. Numerals 301(1) to 301(n) indicate heads respectively positioned on tracks corresponding to a cylinder at a time. Numeral 302 indicates a selector for selecting which of outputs from the heads is to be transferred to the host side unit. Numerals 303a and 303b indicate reproducing and discriminating circuits. Numerals 304(1) to 304(m) indicate buffer memories respectively provided for the heads. Numeral 305 indicates a selector for selecting, as data to be transferred to the host side unit, an output from one of the buffer memories 304(1) to 304(m) or an output from one of the reproducing and discriminating circuits 303a and 303b.

As apparent from FIG. 7, only two reproducing and discriminating circuits 303a and 303b are employed and alternatively used in this embodiment. More specifically, while the track data is read out from a corresponding disk surface by a corresponding head, e.g., the #1 head 301(1), and transferred to the reproducing and discriminating circuit 303a, another track data can be read out from another disk surface by another head, e.g., the #2 head 301(2) and transferred to the reproducing and discriminating circuit 303b, and the read out track data by the #1 and #2 head can be respectively stored in the buffer memories 304(1) and 304(2).

Since the heads are sequentially designated in many cases, probability that the read command for the #2 head 301(2) is received subsequent to that for the #1 head 301(1) is high. In the above case, since the track data by the #2 head is already stored in the corresponding buffer memory, the record data can be immediately transferred to the host side unit. The track data by the next head, e.g., the #3 head is stored in a corresponding buffer memory while the record data by the #2 head is transferred to the host side unit. In this manner, the two reproducing and discriminating circuits are employed in the embodiment so that the performance of the system can be increased.

In the embodiment, it is not necessarily required that the number of heads (n) is equal to that of buffer memories (m). If m>n, the track data can be buffered in the buffer memories over a plurality of cylinders. If m<n, the heads are caused to correspond to the buffer memories in accordance with a predetermined rule, e.g., a rule by which new track data are sequentially written in one of the buffer memories which stores the earliest written track data. Note that a flag and a register (not shown) are provided for each buffer memory, the flag indicating whether or not the track data stored in the buffer memory is available and the register storing a cylinder number and a head number, based on which the track data is read out.

In the above second embodiment (FIGS. 4 and 5), the plurality of heads, the number of which is two in the embodiment and generally K, are respectively positioned on tracks of rotating storage media corresponding to a cylinder at a time, and information read out from the media through these heads in parallel are respectively stored in a plurality of buffer memories or K memories. Part of the information or the whole information is sequentially read out and transferred from these buffer memories to the host side unit K times as fast as the read rate of the information from each track through a corresponding head. Therefore, the information can be transferred from the buffer memories to the host side unit at the transfer rate corresponding to the effective read rate of the information from the rotating storage media.

In the first embodiment (FIGS. 1 to 3), the serial track data read out from the disk is converted into the 16-bit (N-bit in general) parallel data by a serial/parallel converter 14 and transferred to a host side unit through a buffer memory 16. Therefore, the transfer rate from the buffer memory to the host side unit can be easily increased N times as fast as that the read rate from the disk.

In any of the above embodiments, the system for reading out the track data from the disk and transferring the record data of the track data to the host side unit is described. However, the present invention can be applied to the system even when record data transferred from the host side unit is to be written on the disk in response to a write command from the host side unit. For this purpose, in the system according to the present invention, a non-volatile memory is employed as the buffer memory in FIG. 1.

More specifically, the record data transferred from the host side unit is temporarily stored in the non-volatile buffer memory 16 as well as information such as a cylinder number, a head number and a sector address concerning the record data. The record data is read out from the non-volatile buffer memory 16 and written into the disk in a state of the system disconnected from the host side unit when the disk is rotated and the head reaches the position for the record data to be written. Even if the power supply of the disk unit is turned off before the record data is written into the disk after the record data is stored in the non-volatile buffer memory, restoration of the record data can be performed by writing the record data stored in the non-volatile buffer memory into the disk after the power supply is recovered, and then the ready state of the disk unit can be informed to the host side unit.

In addition, when the read command for the same track that the record data is to be written into is received from the host side unit before the data is written into the disk after the record data is stored in the non-volatile buffer memory, the record data read out from the memory can be transferred to the host side unit.

Further, when the read command for another track is received from the host side unit before the record data is written into the disk after the record data is stored in the non-volatile buffer memory, the seek operation can be started after the record data is written into the disk.

Note that, in writing the record data into the disk, the transfer rate from the host side unit to the temporarily storing non-volatile buffer memory can be faster than the write rate of the record data read out from the buffer memory to the disk.

What is claimed is:

1. An information transfer control system for transferring information between a disk unit and a controller, wherein the controller includes means for generating positioning information and a command for reading or writing information from or to said disk unit, said disk unit comprising:
    a) a disk having a plurality of tracks wherein a plurality of record areas are providing and separated from each other by gap fields, each one of said record areas including a count field for recording at least address information of a record and a data field for recording user information, a first address mark indicating a head of each of said record areas being recorded ahead of each of said record areas, a second address mark being recorded ahead of said data field of each of said record areas;
    b) means for positioning a read/write head on a target track on said disk on a basis of the positioning information from said controller so as to read/write the information from or to said target track;
    c) means for generating and providing an interruption for said controller when the read/write head is positioned on the target track;
    d) a buffer memory having a capacity for storing information for at least one track, said information being transferred between said disk and said controller;
    e) phase synchronous means for generating a synchronizing signal for reading the information from said disk;
    f) means for detecting said first and second address marks of the target track in response to the positioning of the read/write head on said target track;
    g) means for synchronizing said phase synchronous means with the information read out from said disk each time said detecting means detects either of said first or second address mark; and
    h) means for transferring the information read out from said target track to said buffer memory without waiting to receive the command for reading from said controller when said phase synchronous means synchronizes with said information.

2. A system according to claim 1, wherein said system further comprises:
    means for selecting either one of an output from said buffer memory and a bypass in communication with said transferring means for transferring the information by bypassing said buffer memory; and,
    means for substantially counting the time period from generation of said interruption to receiving of the command for reading from said controller;
    said selecting means selects said bypass to transfer the information read out from the target track to said controller when said command for reading is received before said counting means counts up to a predetermined value, and
    said selecting means selects said output of said buffer memory and transfers the information of said output to said controller when the counting means counts a value greater than said predetermined value when the command for reading from said controller is received.

3. A system according to claim 1, further comprising means for setting a number of operations which read the information stored in said buffer memory and outputs it, such that said set number is more at one cycle than the number of operations which write the information read out from said disk to said buffer memory.

4. A method of transferring information between a disk unit and a controller, wherein the controller includes means for generating positioning information and a command for reading or writing information from or to said disk unit, the method comprising the steps of:
    a) providing a plurality of tracks on a disk, wherein a plurality of record areas are provided on said tracks and separated from each other by gap fields, each one of said record areas including a count field for recording at least address information of a record and a data field for recording user information, a first address mark indicating a head of each of said record areas being recorded ahead of each of said record areas, a second address mark being recorded ahead of said data field of each of said record areas;

b) positioning a read/write head on a target track on said disk on a basis of the positioning information from said controller so as to read/write the information from/to said target track;

c) generating and providing an interruption for said controller when the read/write head is positioned on the target track;

d) detecting said first and second address marks of the target track in response to the positioning of the read/write head on said target track;

e) synchronizing a phase synchronous circuit with the information read out from said disk each time said detecting means detects either of said first or second address mark; and f) transferring the information read out from said target track to said buffer memory without waiting to receive the command for reading from said controller when said phase synchronous means synchronizes with said information, and then storing said information in said buffer memory.

5. A method according to claim 4, wherein said method further comprises the steps of:

selecting either one of a first mode for outputting the information stored in said buffer memory and a second mode for transferring the information read out from said disk bypassing said buffer memory;

counting, substantially the time period from generation of said interruption for said controller to receiving of the command for reading from said controller by a disk unit;

selecting said second node when said disk unit receives said command for reading before the counting value reaches a predetermined value;

selecting said first node when the counting value exceeds said predetermined value prior to the command for reading from said controller is received, and transferring the information from said buffer memory to said controller.

6. A method according to claim 5, further comprising a step for setting a number of operations which output the information stored in said buffer memory at a time unit to transfer the information to said controller, such that said set number is more at one cycle than the number of operations which write the information read out from said disk to said buffer memory.

7. A method according to claim 4, further comprising a step for setting a number of operations which read the information stored in said buffer memory and outputs it, such that said set number is more at one cycle than the number of operations which write the information read out from said disk to said buffer memory.

* * * * *

UNITED STATES PATENT AND TRADEMARK OFFICE
CERTIFICATE OF CORRECTION

PATENT NO. :     5,267,097
DATED      :     November 30, 1993
INVENTOR(S) :    Akihito Ogino, et al.

It is certified that error appears in the above-identified patent and that said Letters Patent is hereby corrected as shown below:

Claim 1, column 11, line 63, delete "providing" and substitute therefor --provided--.

Claim 5, column 14, lines 7 and 10, delete "node" and substitute therefor --mode--.

Signed and Sealed this

Fourth Day of October, 1994

Attest:

BRUCE LEHMAN

*Attesting Officer*     Commissioner of Patents and Trademarks